(12) United States Patent
Pavlas et al.

(10) Patent No.: US 9,608,733 B2
(45) Date of Patent: Mar. 28, 2017

(54) OPTICAL APPARATUS WITH MULTIPLE TRANSMISSION POWER LEVELS

(71) Applicant: Intel Corporation, Santa Clara, CA (US)

(72) Inventors: Chris Pavlas, Hillsboro, OR (US); Guobin Liu, San Luis Obispo, CA (US); Maciej Machnikowski, Wejherowo (PL); Christine M. Krause, Santa Cruz, CA (US); Scott P. Dubal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 14/300,038

(22) Filed: Jun. 9, 2014

(65) Prior Publication Data

US 2015/0358087 A1 Dec. 10, 2015

(51) Int. Cl.
*H04B 10/04* (2006.01)
*H04B 10/00* (2013.01)
(Continued)

(52) U.S. Cl.
CPC ........... *H04B 10/564* (2013.01); *H04B 10/40* (2013.01); *H04B 10/508* (2013.01)

(58) Field of Classification Search
USPC ....................................................... 398/197
See application file for complete search history.

(56) References Cited

U.S. PATENT DOCUMENTS 6,185,645 B1 * 2/2001 Klein .................. G06F 13/4081
710/302
6,724,993 B2 * 4/2004 Koike .................... H04B 10/00
398/12

(Continued)

FOREIGN PATENT DOCUMENTS

JP       2013051559 A      3/2013

OTHER PUBLICATIONS

Musgrave et al., Safety Design for Space Systems, 2009, Elsevier Ltd., p. 739.*

(Continued)

*Primary Examiner* — Li Liu
*Assistant Examiner* — Jai Lee
(74) *Attorney, Agent, or Firm* — Schwabe, Williamson & Wyatt, P.C.

(57) ABSTRACT

Embodiments of the present disclosure are directed toward techniques and configurations for an optical apparatus to control optical power of the light source. In one embodiment, the apparatus may include a transmitter and receiver to transmit and receive optical signals over an optical communication channel, and a controller to cause the transmitter to transmit pulse signals at a first power level and detect a change in optical power in the channel, indicating a presence of a signal from another optical apparatus. The controller may confirm that the detected apparatus is capable of communications at a second power level (greater than the first level) and initiate data transmission at the second level. Upon detection of a failure in the channel, the controller may cause the transmitter to halt the data transmission and restart the pulse signals at the first power level. Other embodiments may be described and/or claimed.

18 Claims, 6 Drawing Sheets

(51) Int. Cl.
  *H04B 10/564*   (2013.01)
  *H04B 10/508*   (2013.01)
  *H04B 10/40*    (2013.01)

(56) References Cited

U.S. PATENT DOCUMENTS

| | | | | |
|---|---|---|---|---|
| 7,092,630 | B2* | 8/2006 | Cunningham | H04B 10/0799 385/18 |
| 7,184,667 | B2* | 2/2007 | Booth | H04B 10/806 398/135 |
| 7,200,337 | B2* | 4/2007 | Hosking | H04B 10/0799 398/136 |
| 8,805,196 | B2* | 8/2014 | Kasprzyk | H04B 10/40 398/140 |
| 2002/0027690 | A1* | 3/2002 | Bartur | H04B 10/504 398/139 |
| 2003/0095303 | A1* | 5/2003 | Cunningham | H04B 10/0799 398/140 |
| 2004/0141695 | A1* | 7/2004 | Miller | H04B 10/564 385/88 |
| 2005/0035666 | A1* | 2/2005 | Barthelemy | H02H 3/12 307/125 |
| 2008/0267620 | A1* | 10/2008 | Cole | H04B 10/0775 398/17 |
| 2012/0045202 | A1 | 2/2012 | Jiang et al. | |
| 2012/0087676 | A1* | 4/2012 | Lim | H04B 10/116 398/182 |
| 2012/0155867 | A1* | 6/2012 | Giessler | H04B 10/40 398/45 |
| 2012/0275784 | A1 | 11/2012 | Soto et al. | |
| 2012/0301134 | A1* | 11/2012 | Davari | H04L 41/5038 398/9 |
| 2013/0202288 | A1* | 8/2013 | Jia | H04B 10/25 398/15 |
| 2014/0003809 | A1 | 1/2014 | Portier et al. | |
| 2014/0044399 | A1 | 2/2014 | Schmidt et al. | |
| 2014/0133846 | A1* | 5/2014 | Gao | H04B 10/40 398/16 |

OTHER PUBLICATIONS

Mukherjee, Biswannath, Optical WDM Networks, 2006, Springer Science+Business Media, Inc., pp. 234-236.*
International Search Report and Written Opinion for PCT Application No. PCT/US2015/029876, dated Aug. 19, 2015, 10 pages.

\* cited by examiner

OPTICAL APPARATUS WITH MULTIPLE TRANSMISSION POWER LEVELS

FIELD

Embodiments of the present disclosure generally relate to the field of optoelectronics, and more particularly, to techniques and configurations for controlling power of optical apparatuses, such as transceivers, with multiple transmission power levels.

BACKGROUND

Optical devices such as transceivers are often used for data communication in a computing environment. The optical transceivers may include light sources, such as lasers for data communication over optical fiber cables. Optical transceivers may be connected to or otherwise built into optical network interface cards (NICs) that connect computing devices to a computer network or into switches having multiple transceiver ports. The lasers in optical transceivers may be operated continuously (e.g., always powered on) and may expose a user to light.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
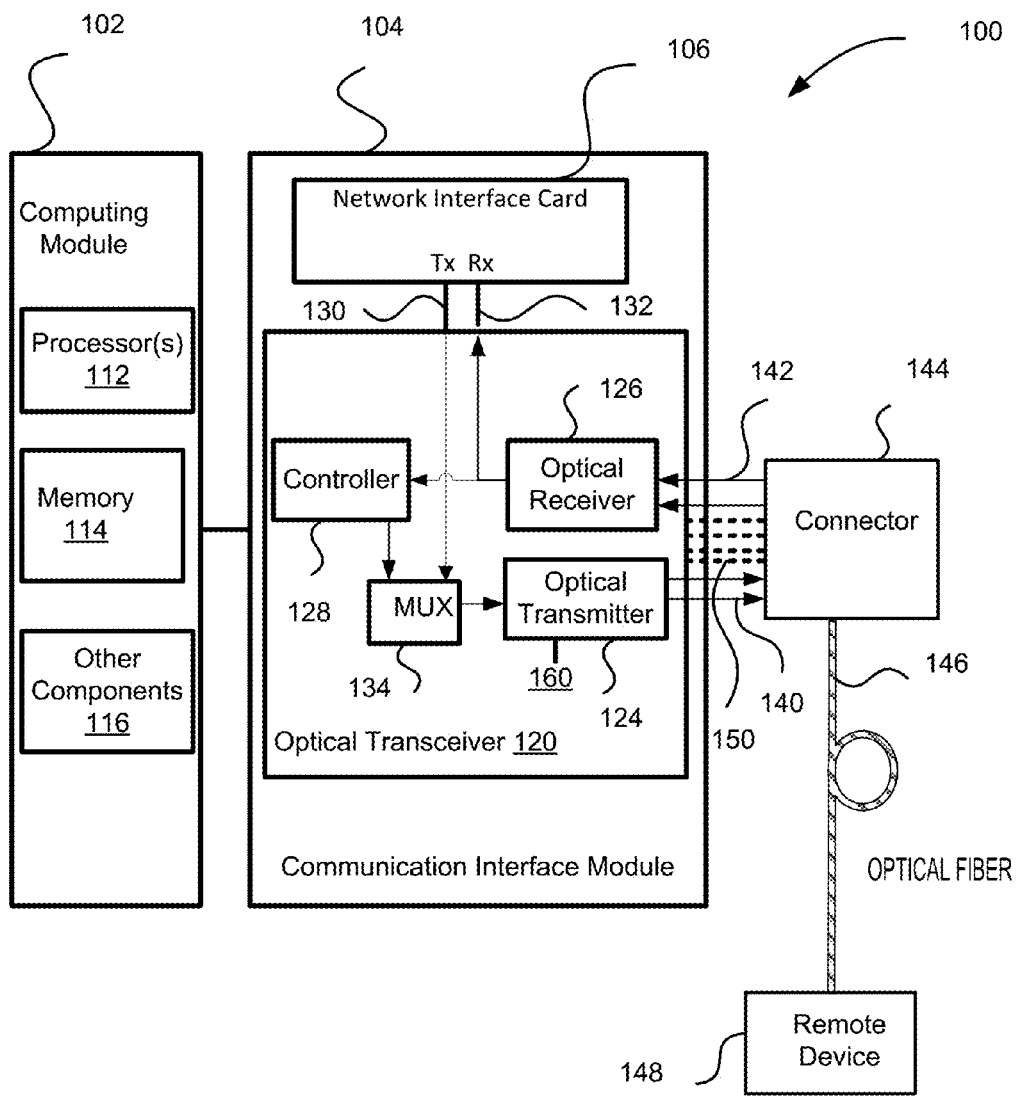
FIG. 1 is a block diagram of a computing device 100 that may include an optical apparatus configured to control optical power of a light source (e.g., laser) using techniques described herein, in accordance with some embodiments.

Embodiments of the present disclosure describe techniques and configurations for including an optical apparatus associated with a computing device and configured to control optical power of a light source. In some embodiments, the optical apparatus, such as an optical transceiver, may include an optical transmitter having a light source and an optical receiver to transmit and receive optical signals over an optical communication channel. The apparatus may include a controller coupled with the transmitter and the receiver to cause the transmitter to transmit over a transmission link of the channel pulse signals at a first power level. The controller may detect a change in optical power in the reception link of the channel that may occur in response to the transmission. The change of the optical power in the reception link may indicate a presence of an optical signal from another optical apparatus on the optical communication channel. The controller may confirm that the detected optical apparatus is capable of communications at a second power level that is greater than the first power level, and initiate data transmission to the apparatus at the second power level. Upon detection of a failure in the optical communication channel, the controller may cause the transmitter to halt the data transmission and restart a transmission of the pulse signals at the first power level.

In some embodiments, the optical apparatus may include other power management features, in addition or in the alternative to the ones discussed above. For example, the circuitry to power on the light source (e.g., laser) of the optical apparatus may include a normally open circuit with a breaker disposed inside a cage adapted to receive an optical fiber cable that provides the optical communication channel. The light source may remain in a default power-off state when no optical fiber cable is attached to the apparatus. Insertion of a fiber optics connector of the optical fiber cable into the cage may trip the breaker, closing the normally open circuit, thus providing power to the light source.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a computing device 100 that may include an optical apparatus configured to control optical power of a light source (e.g., laser) using techniques described herein, in accordance with some embodiments. The computing device 100 may be used to transmit an optical signal via an optical fiber, for example, between racks in a data center, or long distance, between data storage facilities, data centers, and the like.

As illustrated, the computing device 100 may include a computing module 102 having a processor 112, a memory 114, and other components 116 configured to provide desired computing and other functionalities for the computing device 100, coupled with each other. The computing device 100 may further include a communication interface module 104 configured to provide network connectivity for the computing device 100.

In some embodiments, the processor 112 and/or memory 114 of the computing device 100 may be configured to generate and/or process data provided to a network (not shown) or from the network via the communication interface module 104. It should be appreciated that, in some embodiments, any or all of the illustrated components, such as the communication interface module 104, may be separate from and remote to, but communicatively coupled with, the computing device 100 (e.g., with computing module 102, as shown). In some embodiments, one or more of the illustrative components may be incorporated in or otherwise be a portion of another component. For example, the memory 114, or portions thereof, may be incorporated in the processor 112 in some embodiments. An example configuration of the computing device 100 is described in more detail in reference to FIG. 7.

The communication interface module 104 may include a network interface card (NIC) 106 (e.g., optical NIC) configured to connect the computing device 100 to a computer network, as will be described below in greater detail. The NIC 106 may be associated with (e.g., connected with via one or more transmission and reception connections 130 and 132) an optical apparatus such as optical transceiver 120.

The optical transceiver 120 may include a transmitter 124 having a light source (e.g., laser) 160 and an optical receiver 126 to connect with a network and/or another computing device, such as remote device 148 comprising an optical apparatus, over one or more optical communication channels 150 (shown in dashed lines). Although four communication channels 150 are shown, fewer or more communication channels may be used in the communication interface module 104, e.g., to provide a desired data transmission rate. Each communication channel 150 may comprise a transmission link 140 and a reception link 142. The communication channel 150 comprising the transmission and reception links 140 and 142 may be implemented via an optical waveguide, e.g., optical fiber cable 146 connected with the communication interface module 104 with a connector 144, e.g., Standard Connector (SC), Local Connector (LC), Multi-Fiber Push-On/Push-off (MPO) connector for Quad Small Form-Factor Pluggable (QSFP), or other fiber optic connector, as described in greater detail in reference to FIGS. 3-5.

The data to be transmitted may be provided by the computing module 102 to the communication interface module 104. For example, the data signal may be provided, via Tx connection 130 connecting the NIC 106 to a multiplexer (MUX) 134. At MUX 134, a signal multiplexed from connection 130 may be input to the optical transmitter 124, to be transmitted as an optical signal to the remote device 148 via the transmission link 140 over the optical fiber cable 146. The data to be received by device 100 may be provided via the cable 146 to the optical receiver 126 and to the NIC 106 via Rx connection 132.

The optical transceiver 120 may further include a controller 128 (e.g., microcontroller) to control the operation of the transmitter 124 and receiver 126, among other functions. In some embodiments, the controller 128 may control the optical power of the light source 160 to initiate transmission (e.g., short pulses or bursts) at a first power level. The pulse transmission may be initiated to determine whether the optical communication channel 150 is established. For example, the controller 128 may cause the transmitter 124 to transmit over the transmission link 140 of the optical communication channel 150 a set of first pulse signals (e.g., "initial" (INIT) pulses) at the first power level.

The controller 128 may monitor the reception link 142 of the optical communication channel 150 (e.g., receiver 126) to determine whether any change in optical power in the reception link 142 has occurred in response to the transmission of the first pulse signals. A change in the optical power in the reception link 142 may indicate a presence of another optical apparatus, e.g., the remote device 148 at the other end of the optical communication channel 150.

The controller 128 may attempt to confirm that the detected optical apparatus is capable of communications at a desired (e.g., second) power level, which may be greater than the first power level. For example, the controller 128 may cause the transmitter 124 to transmit a set of second pulse signals at the first power level over the transmission link 140 to the detected optical apparatus, remote device 148. The second pulse signals may be different (e.g., in length or frequency) than the first pulse signals. For example, the second pulse signals may comprise "acknowledge" (ACK) pulses.

The controller 128 may further monitor the reception link 142 (e.g., receiver 126) to detect a reception of pulse signals in the reception link 142 in response to the transmission of the set of the second pulse signals. The received pulse signals, if detected, may be similar in characteristics (e.g., length or frequency) to the second pulse signals (e.g., ACK pulses). A reception of the second pulse signals may indicate a confirmation of an ability of the detected optical apparatus (e.g., remote device 148) to communicate at the second power level.

The controller 128 may further control the optical power of the light source 160 to switch to a second power level that may be greater than the first power level, to provide data transmission at a desired speed. The data transmission at the second power level may be deemed safe for the user because a link with the remote device 148 has been verifiably established via the pulse signal transmission and reception iterations described above, so the light source 160 is not idling in a power-on state, presenting a potential eye-safety threat, but transmitting data to the device 148 via the optical communication channel 150.

The controller 128 may further control the optical power of the light source 160 of the transmitter 124 to halt the transmission at the second power level (e.g., switch to the first power level) if one or more failure conditions pertaining to the optical communication channel 150 may be detected. The failure conditions may include, for example, ambient conditions (e.g., temperature) exceeding a desired level, voltage in the channel exceeding a desired threshold (or, conversely, falling below a desired threshold), lost link (e.g., due to cable 146 unplug), and the like.

To detect at least some failure conditions, the controller 128 may monitor the reception link 142. For example, during the data transmission at the second power level, the controller 128 may determine that the received signal strength indicator (RSSI) or other such indicator in the reception link is below a desired threshold, which may indicate a failure such as the cable 150 unplug. The controller 128 may halt the data transmission at the second power level and restart a transmission of first pulse signals (INIT pulses) at the first power level.

In another example, before initiating a transmission over the transmission link 140 of the optical communication channel 150 first pulse signals (e.g., INIT pulses) at the first power level, the controller 128 may determine that RSSI in the reception link 142 is above a desired threshold. The controller 128 may issue a link reset condition on the transmission link 140 in order to reinitialize a transmission of first pulse signals (INIT pulses) at the first power level at a link partner (e.g., remote device 148), and check again to determine whether RSSI in the reception link 142 is within the desired range.

As discussed above, the optical communication channel 150 may comprise multiple communication channels. The controller 128 may be configured to attend to each of the optical communication channels 150 within a designated polling window (e.g., time period). Within the designated polling window for a particular channel, the controller 128 may conduct the operations described above (initiate transmission of the first pulse signals, confirm the capability of the optical device at the other end of the channel to communicate at the second power level, conduct data transmission at the second power level, check for channel failures, etc.), and move on to the next channel. For example, if the optical communication channel 150 comprises four channels, the polling window allocated to each channel may be T ms. The polling cycle for four channels may comprise 4×T ms+TD, where TD is delay between the cycles (for example, about 1 ms or less).

In some embodiments, the first power level may correspond to the power range according to an industry standard, e.g., Class 1 Laser Safety Standard 60825-1 as provided by the International Electrotechnical Commission (IEC) and/or ANSI Z136 as provided by the American National Standards Institute (ANSI). In some embodiments, the second power level may correspond to the power range according to another industry standard, e.g., Class 3R Laser Safety Standard as provided by IEC. The light at Class 3R power level may be potentially damaging to human eyes in case of direct exposure.

Figure 2:
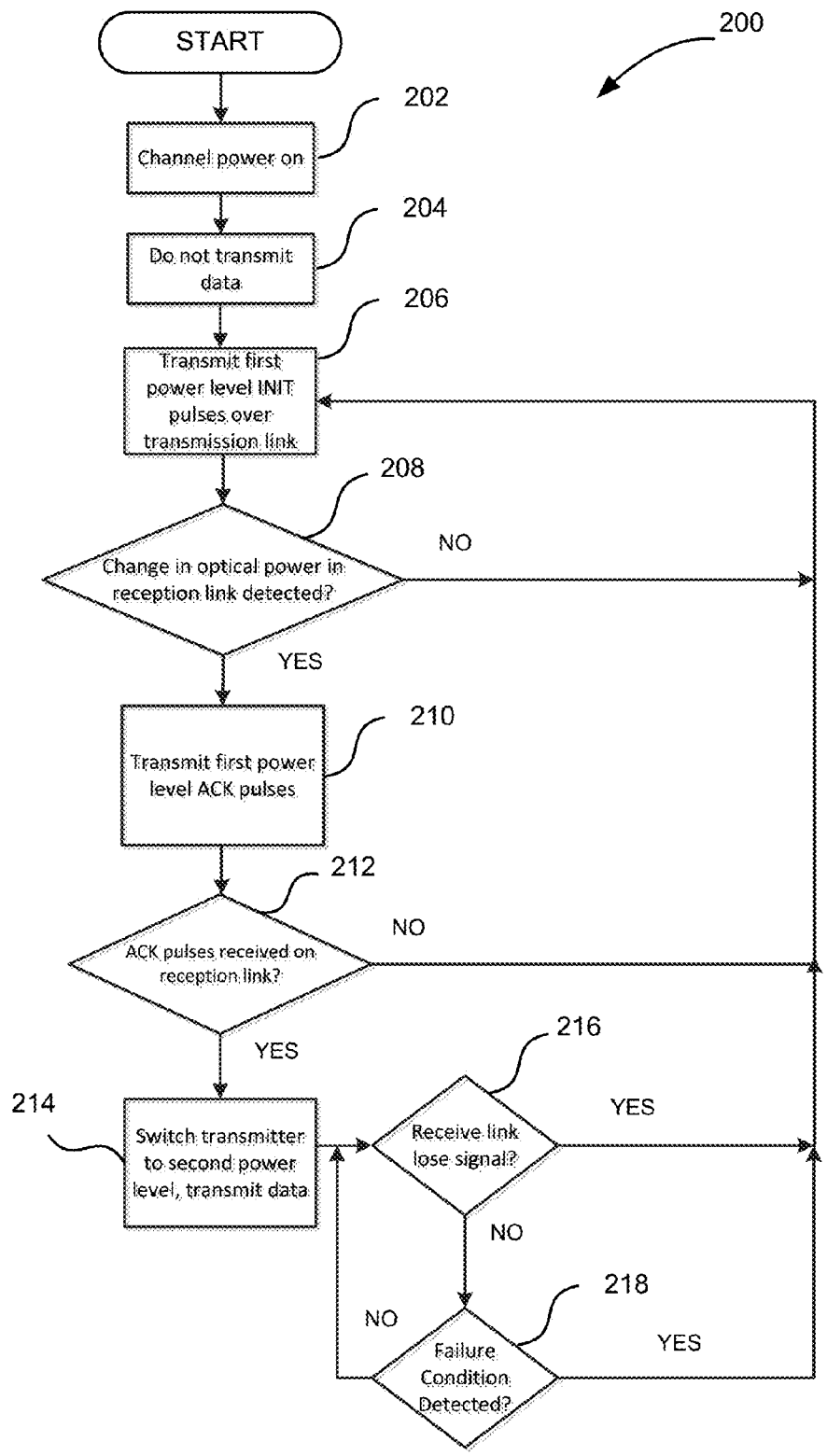
FIG. 2 is an example process flow diagram for operation of an optical apparatus (e.g., optical transceiver) in a computing device, in accordance with some embodiments.

FIG. 2 is an example process flow diagram for operation of an optical apparatus (e.g., optical transceiver) in a computing device (e.g., device 100), in accordance with some embodiments. The process 200 may comport with actions described in connection with FIG. 1 in some embodiments.

The process 200 may begin at block 202, where an optical communication channel (e.g. 150) between the computing device (e.g., 100) and a network may be powered on. The transceiver (e.g., 120) may not immediately initiate data transmission to the network (e.g., at the second power level), as indicated by 204. Instead, at block 206, the transceiver may initiate a transmission over a transmission link (e.g., 140) of an optical communication channel (e.g., 150) of a first set of first pulse signals at a first power level (e.g., INIT pulses).

At decision block 208, the transceiver may determine whether a change in optical power in a reception link (e.g., 142) of the optical communication channel is detected. The change may occur in response to the transmission of the first pulse signals and indicate a presence of an optical signal of another optical apparatus on the optical communication channel (e.g., at the other end of the optical communication channel). If no change is detected, the transceiver may continue transmitting first pulse signals.

If the change in optical power in the reception link is detected, the transceiver may initiate a transmission of second pulse signals (e.g., ACK pulses) at the first power level to the detected optical apparatus.

At decision block 212, the transceiver may determine whether the second pulse signals have been detected in the reception link, in response to the transmission of the second pulse signals. If no second pulse signals (e.g., ACK pulses) have been received, the process 200 may return to block 206 and the transmission of the first pulse signals may be resumed.

If the second pulse signals (e.g., ACK pulses) have been received, the reception of the second pulse signals may indicate to the transceiver a confirmation of an ability of the detected optical apparatus to communicate at a second power level. Accordingly, at block 214, the transceiver may initiate data transmission at the second power level over the transmission link to the detected optical apparatus. As discussed above, the second power level may be greater than the first power level.

At decision blocks 216 and 218, the transceiver may determine whether any failures associated with the data transmission or optical communication channel have been detected. For example, at decision block 216, the transceiver may determine whether a "lose signal" indication has been received in the reception link, indicating a failure in the optical communication channel (e.g., the optical cable may be unplugged). At decision block 218, the transceiver may determine whether other failure condition(s) occurred in the communication channel, as described in reference to FIG. 1.

If no failures have been detected, the data transmission at the second power level may continue. If a failure has been detected, remedial measures may be taken as described in reference to FIG. 1. For example, the data transmission may be halted and the process 200 may essentially repeat before resuming data transmission at the second power level. For example, the process 200 may move to block 206, and the transmission of the first pulse signals may be resumed.

In addition or in alternative to the optical transceiver power control techniques described above, other techniques directed at controlling power of the light source may be employed in a computing device with an optical transceiver such as one described in reference to FIGS. 1 and 2. For example, as described below in reference to FIGS. 3-5, the optical transceiver may be configured to keep the light source (e.g., laser) in a power-off state and power on the laser when an optical communication channel is operational, e.g., when an optical cable is plugged into the communication interface module, such as module 104, with a NIC (e.g., NIC 106) and optical transceiver (e.g., 120).

Figure 3:
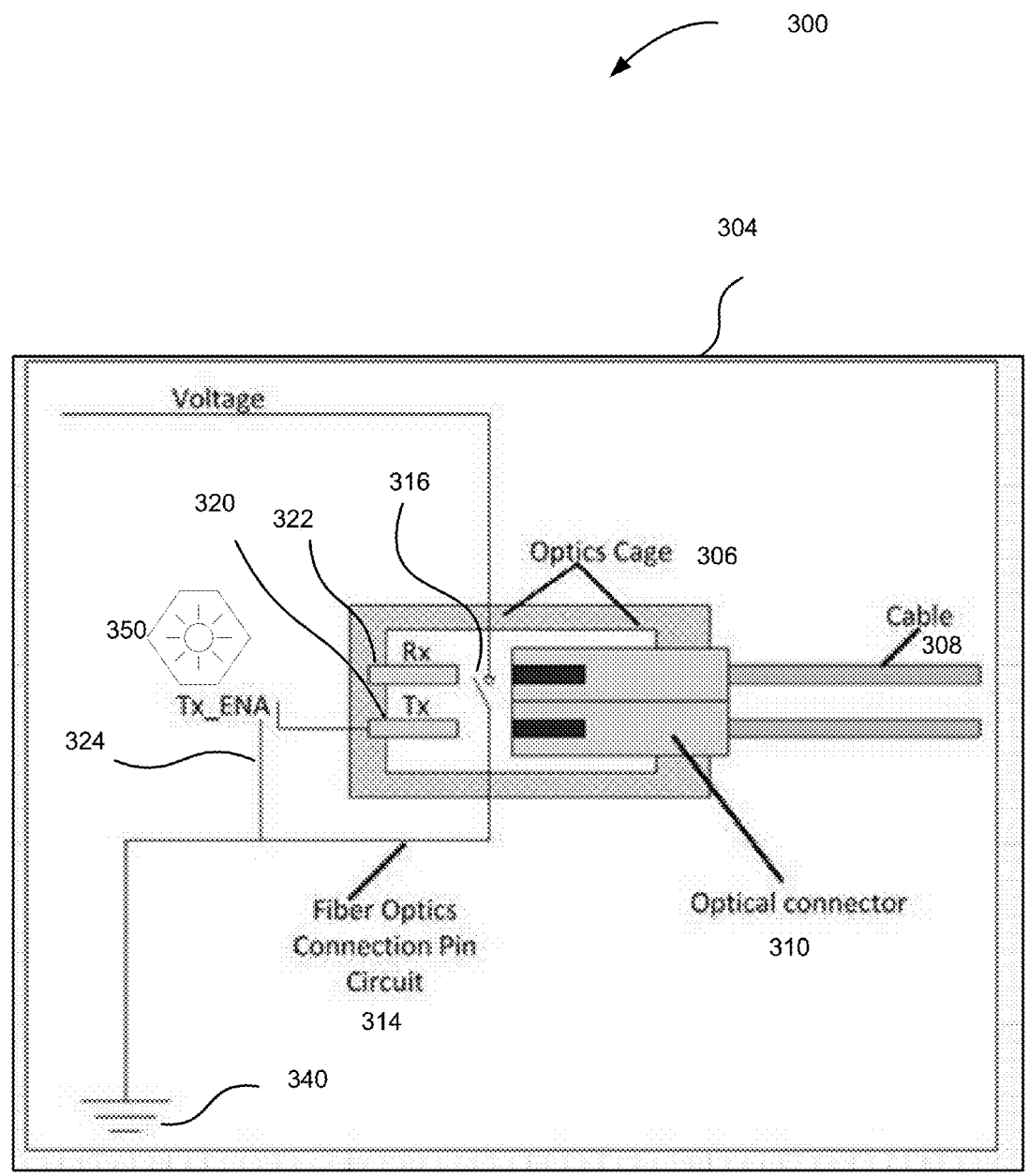
FIG. 3 is a block diagram schematically illustrating an example optical arrangement similar to the optical apparatus described in reference to FIG. 1.

FIG. 3 is a block diagram schematically illustrating an example optical arrangement 300 similar to the optical apparatus described in reference to FIG. 1. The optical arrangement 300 may be disposed, for example, on a printed circuit board (PCB) (or other packaging technology). In FIG. 3, the optical arrangement 300 is shown as disposed on PCB 304 (by way of example and not limiting to this packaging technology) and may include an optical transceiver similar to 120 coupled with a NIC (e.g., 106) to facilitate optical communications via an optical communications channel (e.g., 150) similarly to the communication interface module 104 described in reference to FIG. 1.

In some embodiments, the transceiver may include a transmitter having a laser 350 to transmit optical signals over an optical communication channel and a receiver to receive optical signals over the optical communication channel. For simplicity purposes, at least some of the transceiver and NIC components (e.g., transmitter and receiver) are not shown in FIG. 3.

The optical arrangement 300 may further include a cage (e.g., receptor) 306 to receive an optical fiber cable 308 that provides the optical communication channel between the computing device that includes the arrangement 300 (e.g., device 100) and a computer network (not shown). The cage may be connected to the PCB 304 as known in the art. A waveguide such as the optical fiber cable 308 may be coupled with the optical arrangement 300 disposed on the PCB 304 in a variety of ways. For example, as discussed above, the optical fiber cable 308 may be connected with the cage 306 via an optical connector 310, such as SC, LC, MPO for QSFP, or other fiber optic connector. While the transmitter and receiver of the optical arrangement are omitted for simplicity purposes, connectors 320 and 322 between the transmitter and receiver disposed on the PCB 304 and the optical connector 310 of the cable 308 are illustrated in FIG. 3. As shown, the connectors 320 and 322 are configured to be received by the optical connector 310 when the optical connector 310 is inserted into (plugged into) the cage 306.

The optical arrangement 300 may further include a transmission enabling circuitry 324 to power on light source 350 (e.g., laser) included in the optical transceiver of the optical arrangement 300. The transmission enabling circuitry components are not shown in FIG. 3 for simplicity purposes. The connections between the transmission enabling circuitry 324 and the laser 350 are indicated by Tx_ENA.

In some embodiments, a connection pin circuit 314, such as a low-voltage open circuit, may be added to the transmission enabling circuitry 324. The connection pin circuit 314 may include a breaker (e.g., a connection pin) 316 that may be disposed inside the cage 306. The connection pin circuit 314 may be normally open, e.g., the breaker 316 may be in a normally open state. When the fiber optics connector 310 is inserted into the cage 306, the breaker 316 may trip (switch) to close the normally open connection pin circuit 314, effectively grounding the laser power line, e.g., transmission enabling circuitry 324, to a common ground 340 of the PCB 304.

Figure 4:
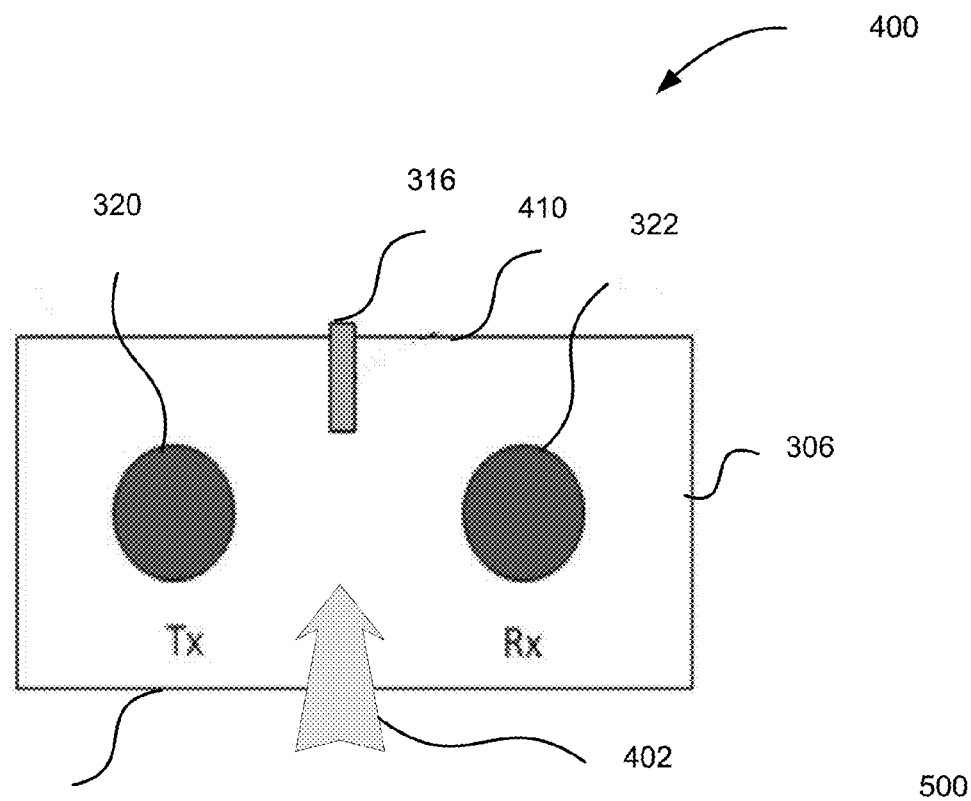
FIGS. 4-5 schematically illustrate cross-section front and side views of the example optical arrangement of FIG. 3, in accordance with some embodiments.
Figure 5:
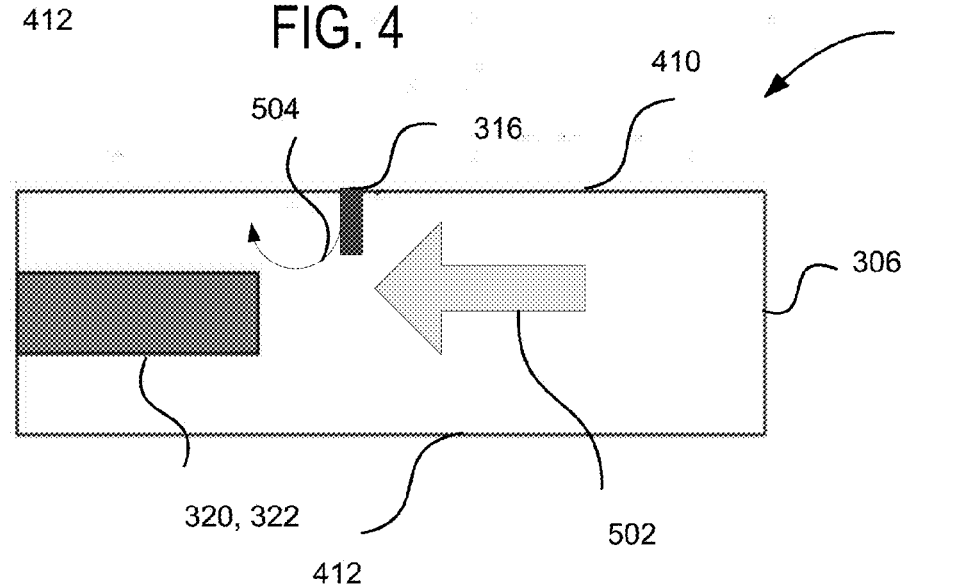

FIGS. 4 and 5 illustrate cross-section front view 400 and side view 500 of a portion of the example optical arrangement 300 that includes the cage 306, connectors 320 and 322, and breaker (e.g., connection pin) 316, in accordance with some embodiments. In general, the breaker 316 may be disposed inside the cage 306 such as to ensure that insertion of the connector 310 may trip the breaker 316 and close the connection pin circuit 314. In one example, the breaker may be movably disposed inside the cage 306 around a cage top 410, substantially perpendicular to a bottom plane 412 of the cage 306, as shown in FIGS. 4 and 5. The optical connector 310, when being inserted in the cage 306 as shown by arrows 402 and 502, may press onto, and trip, the breaker 316 in the direction indicated by a curved arrow 504, causing the connection pin circuit 314 to complete, thus powering on the laser 350 of the optical arrangement 300.

Accordingly, the laser 350 of the optical arrangement described in reference to FIGS. 3-5 may not be powered on unless the optical fiber cable 308 is plugged into the optical arrangement 300 as described above. Accordingly, there is no laser beam inside the cage 306 in the absence of the plugged-in optical fiber cable 308.

Figure 6:
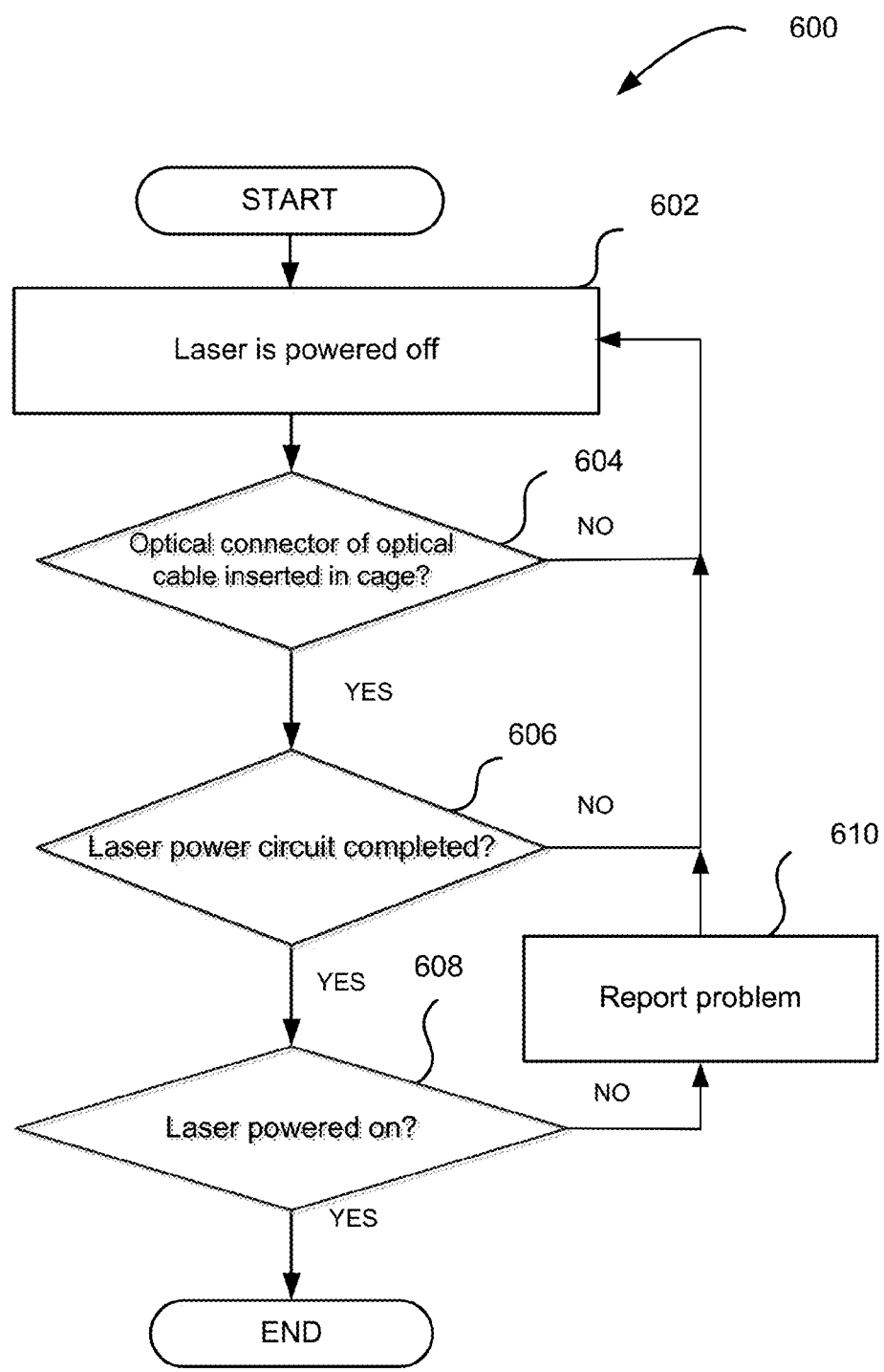
FIG. 6 is an example process flow diagram for operating the example optical arrangement, in accordance with some embodiments.

FIG. 6 schematically illustrates a flow diagram for a process 600 of operating the optical arrangement 300 of FIGS. 3-5, in accordance with some embodiments. The operation of the optical arrangement 300 may be executed, for example, by a controller similar to controller 128 of FIG. 1.

At block 602, the laser 350 may be in a powered-off state, which may be a default state of the laser 350 in the absence of an established connection between the optical arrangement 300 and the network via the optical fiber cable 308.

At decision block 604 it may be determined whether the connection between the optical arrangement 300 and the network via the optical fiber cable 308 has been established, e.g., whether the connector 310 has been inserted into the cage 306, to receive the transmitter and receiver connectors 320, 322. If no connection is established, the laser 350 may remain in the power-off state.

If the connection has been established (e.g., the connector 310 has been inserted into the cage 306), it may be determined at decision block 606 whether the laser power circuit has been completed, e.g., whether the breaker 316 has been tripped by the insertion of the optical connector 310 to close the connection pin circuit 314, grounding the laser power line, e.g., transmission enabling circuitry 324 to the common ground 340 of the PCB 304. If the circuit 314 has not been completed, the laser 350 may remain in the power-off state.

If the connection pin circuit 314 has been completed, at decision block 608, it may be determined whether laser 350 is powered on. If the laser is powered on, the process 600 may end. If the laser is not powered on, this may indicate (with a desired level of probability) that a problem may exist in relation to the transmission enabling circuitry 324. The problem may be indicated (e.g., reported via an alert issued by the controller 128) at block 610, and the laser 350 may remain in the power-off state until the problem is resolved.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 7:
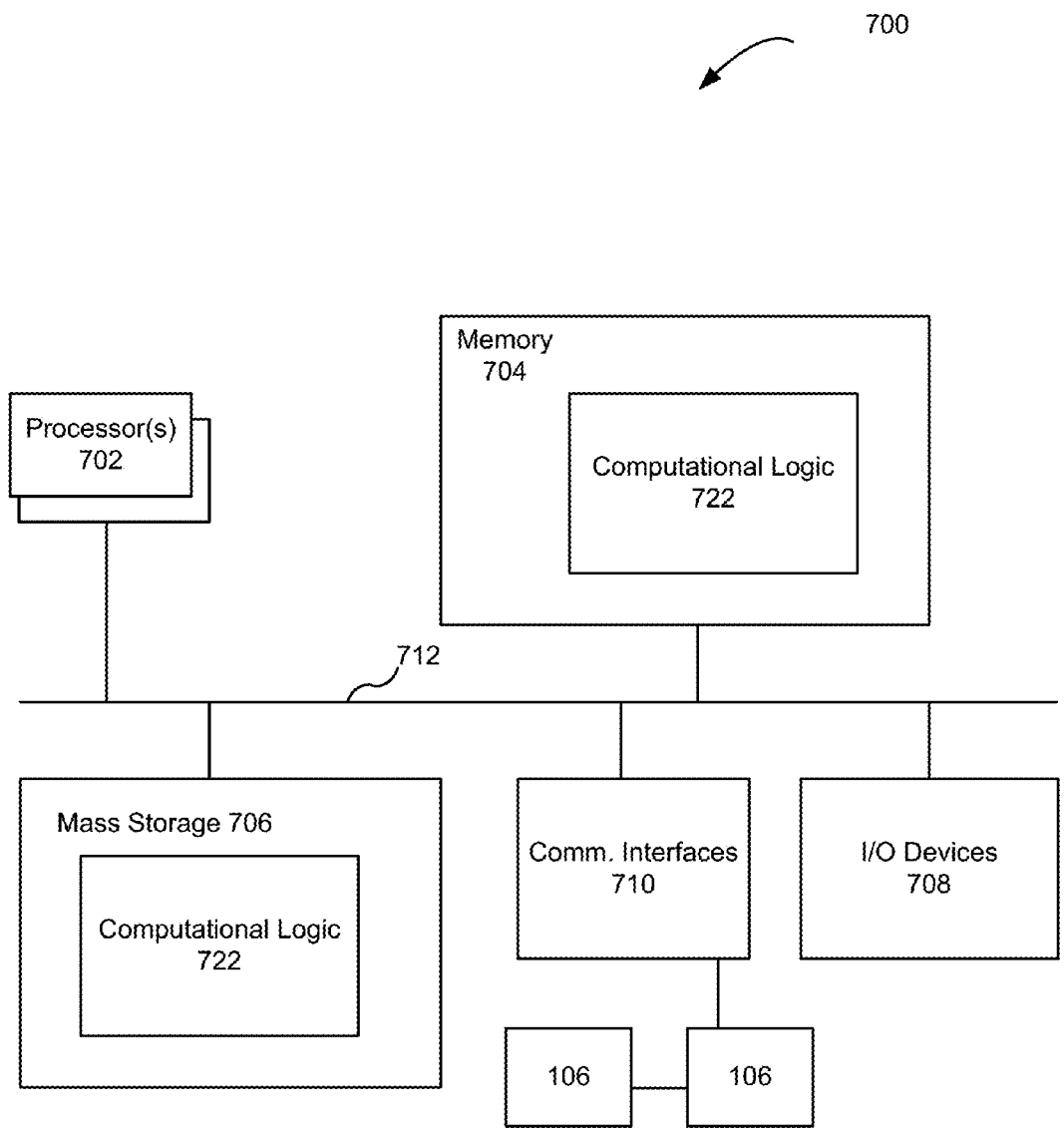
FIG. 7 schematically illustrates an example computing device including at least some of the components of the optical apparatus of FIGS. 1-6, in accordance with some embodiments.

FIG. 7 illustrates an example computing device 700 suitable for use with various components of FIG. 1, such as computing device 100 including NIC 106 and optical transceiver 120 of FIG. 1, and/or optical arrangement 300 of FIG. 3, in accordance with various embodiments. As shown, computing device 700 may include one or more processors or processor cores 702 and system memory 704. For the purpose of this application, including the claims, the terms "processor" and "processor cores" may be considered synonymous, unless the context clearly requires otherwise. The processor 702 may include any type of processors, such as a central processing unit (CPU), a microprocessor, and the like. The processor 702 may be implemented as an integrated circuit having multi-cores, e.g., a multi-core microprocessor. The computing device 700 may include mass storage devices 706 (such as diskette, hard drive, volatile memory (e.g., dynamic random-access memory (DRAM), compact disc read-only memory (CD-ROM), digital versatile disk (DVD), and so forth)). In general, system memory 704 and/or mass storage devices 706 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 700 may further include input/output (I/O) devices 708 (such as a display (e.g., a touch-screen display), keyboard, cursor control, remote control, gaming controller, image capture device, and so forth) and communication interfaces 710 (such as network interface cards, optical apparatuses, modems, infrared receivers, radio receivers (e.g., Bluetooth), and so forth).

In some embodiments, the communication interfaces 710 may include some or all of the components of the communication interface module 104, such as NIC 106 and optical transceiver 120. For example, the communication interfaces 710 may include optical transceiver 120 implementing aspects of the transmitter 124 with the light source 160, optical receiver 126, MUX 134, and controller 128 as described above. In some embodiments, the controller 128 may comprise a state machine. In some embodiments, at least some components of the optical transceiver 120 may be communicatively coupled with the computing device 700, e.g., via bus 712.

In some embodiments, the communication interfaces 710 may include components configured similarly to the optical arrangement 300 of FIGS. 3-5. For example, the communication interfaces 710 may be disposed on the PCB 304 and include cage 306 with connection pin circuit 314 having the breaker 316 configured as described in reference to FIG. 3.

The communication interfaces 710 may include communication chips (not shown) that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and mass storage devices 706 may be employed to store a working copy and a permanent copy of the programming instructions for the operation of the controller 128 of FIG. 1. The various elements may be implemented by assembler instructions supported by processor(s) 702 or high-level languages that may be compiled into such instructions.

The permanent copy of the programming instructions may be placed into permanent storage devices 706 in the factory, or in the field through, for example, a distribution medium (not shown), such as a compact disc (CD), or through communication interface 710 (from a distribution server (not shown)). That is, one or more distribution media having an implementation of the agent program may be employed to distribute the agent and to program various computing devices.

The number, capability, and/or capacity of the elements 708, 710, 712 may vary, depending on whether computing device 700 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 704 may include computational logic 722 configured to practice aspects of embodiments, such as operations described in reference to FIGS. 1-6. For one embodiment, at least one of processors 702 may be packaged together with computational logic 722 configured to practice aspects of optical signal modulation described herein to form a System in Package (SiP) or a System on Chip (SoC).

In various implementations, the computing device 700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 700 may be any other electronic device that processes data.

According to various embodiments, the present disclosure describes a number of examples. Example 1 is an optical apparatus for controlling communications at different power levels, comprising: a transmitter having a light source to transmit first optical signals over a transmission link of at least one optical communication channel; a receiver to receive second optical signals over a reception link of the at least one optical communication channel; and a controller coupled with the transmitter and the receiver to: cause the transmitter to transmit over the transmission link a first set of first pulse signals at a first power level; detect a change in optical power in the reception link, wherein the change indicates a presence of an optical signal from another optical apparatus on the optical communication channel; confirm that the other optical apparatus is capable of communications at a second power level; and initiate data transmission at the second power level over the transmission link by the transmitter to the other optical apparatus, wherein the second power level is greater than the first power level.

Example 2 may include the subject matter of Example 1, and further specifies that the change in optical power in the reception link occurs in response to the transmission of the first pulse signals Example 3 may include the subject matter of Example 1, and further specifies that to confirm that the another optical apparatus is capable of communications at a second power level includes: to cause the transmitter to transmit a first set of second pulse signals at the first power level over the transmission link to the another optical apparatus, and to detect a reception of a second set of the second pulse signals in the reception link in response to the transmission of the first set of the second pulse signals, wherein the reception of the second set of the second pulse signals indicates a confirmation of an ability of the another optical apparatus to communicate at the second power level.

Example 4 may include the subject matter of Example 1, and further specifies that the controller may detect at least one failure condition in the optical communication channel and cause the transmitter to transmit a second set of the first pulse signals at the first power level over the transmission link.

Example 5 may include the subject matter of Example 1, and further specifies that the controller is to cause the first and second pulse signals to be transmitted through the transmitter during a transmission time period allocated for the optical communication channel.

Example 6 may include the subject matter of Example 1, and further specifies that the failure condition comprises one of: voltage above a first threshold, voltage below a second threshold, temperature above a third threshold, or ambient condition above a fourth threshold.

Example 7 may include the subject matter of Example 1, and further specifies that the light source is a laser.

Example 8 may include the subject matter of Example 1, and further specifies that the first power level corresponds to a Class 1 American National Standards Institute (ANSI) Laser Safety Standard and the second power level corresponds to a Class 3R ANSI Laser Safety Standard.

Example 9 may include the subject matter of any of Examples 1 to 8, and further specifies that the controller may further detect at least one failure condition in the optical communication channel during the transmission of the first set of first pulse signals and cause the transmission to be disabled or restarted.

Example 10 may include a network interface card, comprising the optical apparatus of Example 1.

Example 11 is a computing system, comprising: a processor; a memory coupled with the processor; and a communication interface device coupled with the processor and memory, to connect the computing system with a network, wherein the communication interface device includes a network interface card having the optical apparatus of claim 1.

Example 12 is a method for controlling communications at different power levels, comprising: initiating, by an optical apparatus, a transmission over a transmission link of an optical communication channel of a first set of first pulse signals at a first power level; detecting, by the optical apparatus, a change in optical power in a reception link of the optical communication channel, the change occurring in response to the transmission of the first pulse signals and indicating a presence of an optical signal of another optical apparatus on the optical communication channel; confirming, by the optical apparatus, that the other optical apparatus is capable of communications at a second power level; and initiating, by the optical apparatus, data transmission at the second power level over the transmission link to the other optical apparatus, wherein the second power level is greater than the first power level.

Example 13 may include the subject matter of Example 12, and further specifies that confirming that the other optical apparatus is capable of communications at a second power level comprises: initiating, by the optical apparatus, a transmission of a first set of second pulse signals at the first power level to the other optical apparatus; and detecting, by the optical apparatus, a reception of a second set of the second pulse signals in the reception link in response to the transmission of the first set of second pulse signals.

Example 14 may include the subject matter of Example 13, and further specifies detecting, by the optical apparatus, at least one failure condition in the optical communication channel; and initiating, by the optical apparatus, a transmission of a second set of the first pulse signals at the first power level over the transmission link.

Example 15 is an optical arrangement to transmit and receive optical signals over an optical communication channel to a network, the optical arrangement including: a transmitter having a laser to transmit first optical signals over the optical communication channel; a receiver to receive second optical signals over the optical communication channel; a cage to receive an optical fiber cable that provides the optical communication channel; and circuitry to power on the laser, the circuitry including a normally open circuit having a breaker disposed inside the cage, wherein insertion of a fiber optics connector of the optical fiber cable into the cage trips the breaker to close the normally open circuit.

Example 16 may include the subject matter of Example 15, and further specifies that the optical arrangement may include a printed circuit board (PCB), wherein the cage is connected to the PCB.

Example 17 may include the subject matter of Example 16, and further specifies that the circuit may ground a laser power line of the circuitry to a common ground of the PCB.

Example 18 may include the subject matter of any of Examples 15 to 17, and further specifies that a network interface card (NIC) may be coupled with the optical arrangement to enable transmission and reception of the optical signals by the transmitter and receiver of the optical arrangement.

Example 19 may include the subject matter of Example 15, and further specifies that the optical arrangement may include a controller coupled with the transmitter and the receiver to cause the transmitter to transmit over a transmission link of the optical communication channel a first set of first pulse signals at a first power level; detect a change in optical power in a reception link of the optical communication channel, wherein the change indicates a presence of an optical signal from another optical apparatus on the optical communication channel; confirm that the other optical apparatus is capable of communications at a second power level; and initiate data transmission at the second power level over the transmission link by the transmitter to the other optical apparatus, wherein the second power level is greater than the first power level.

Example 20 is computing system, comprising: a processor; a memory coupled with the processor; and a communication interface device coupled with the processor and memory, to connect the computing system with a network, wherein the communication interface device includes a network interface card having the optical arrangement of Example 15.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
   a transmitter having a light source to transmit first optical signals over a transmission link of at least one optical communication channel;
   a receiver to receive second optical signals over a reception link of the at least one optical communication channel; and
   a controller coupled with the transmitter and the receiver to:
   prior to initiation of transmission of the first optical signals over the transmission link of the at least one optical communication channel, cause the transmitter to transmit over the transmission link a first set of first pulse signals at a first power level;
   detect a change in optical power in the reception link, wherein the change indicates a presence of an optical signal from another optical apparatus on the optical communication channel;
   cause the transmitter to transmit a first set of second pulse signals at the first power level over the transmission link to the another optical apparatus, wherein the second pulse signals are different than the first pulse signals in length or frequency, wherein the first and second pulse signals are independent of data to be provided in the first optical signals;
   detect a reception of a second set of the second pulse signals in the reception link in response to the transmission of the first set of the second pulse signals, wherein the reception of the second set of the second pulse signals indicates a confirmation of an ability of the another optical apparatus to communicate at a second power level; and
   initiate transmission of the first optical signals at the second power level over the transmission link by the transmitter to the other optical apparatus, wherein the second power level is greater than the first power level.

2. The optical apparatus of claim 1, wherein the change in optical power in the reception link occurs in response to the transmission of the first pulse signals.

3. The optical apparatus of claim 1, wherein the controller is to further:
   detect at least one failure condition in the optical communication channel; and
   cause the transmitter to transmit a second set of the first pulse signals at the first power level over the transmission link.

4. The optical apparatus of claim 3, wherein the controller is to cause the first and second pulse signals to be transmitted through the transmitter during a transmission time period allocated for the optical communication channel.

5. The optical apparatus of claim 3, wherein the failure condition comprises one of: voltage above a first threshold, voltage below a second threshold, temperature above a third threshold, or ambient condition above a fourth threshold.

6. The optical apparatus of claim 1, wherein the light source is a laser.

7. The optical apparatus of claim 1, wherein the first power level corresponds to a Class 1 American National Standards Institute (ANSI) Laser Safety Standard and the second power level corresponds to a Class 3R ANSI Laser Safety Standard.

8. The optical apparatus of claim 1, wherein the controller is to further:
   detect at least one failure condition in the optical communication channel during the transmission of the first set of first pulse signals; and
   cause the transmission to be disabled or restarted.

9. A network interface card, comprising the optical apparatus of claim 1.

10. A computing system, comprising:
    a processor;
    a memory coupled with the processor; and
    a communication interface device coupled with the processor and memory, to connect the computing system with a network, wherein the communication interface device includes a network interface card having the optical apparatus of claim 1.

11. A method, comprising:
    initiating, by an optical apparatus, prior to initiating data transmission over a transmission link of an optical communication channel of the optical apparatus, a transmission over the transmission link of the optical communication channel of a first set of first pulse signals at a first power level;
    detecting, by the optical apparatus, a change in optical power in a reception link of the optical communication channel, the change occurring in response to the transmission of the first pulse signals and indicating a presence of an optical signal of another optical apparatus on the optical communication channel;
    transmitting, by the optical apparatus, a first set of second pulse signals at the first power level over the transmission link to the another optical apparatus, wherein the second pulse signals are different than the first pulse signals in length or frequency, wherein the first and second pulse signals are independent of the data to be transmitted over the transmission link;
    detecting, by the optical apparatus, a reception of a second set of the second pulse signals in the reception link in response to the transmission of the first set of the second pulse signals, wherein the reception of the second set of the second pulse signals indicates a confirmation of an ability of the another optical apparatus to communicate at a second power level; and
    initiating, by the optical apparatus, data transmission at the second power level over the transmission link to the other optical apparatus, wherein the second power level is greater than the first power level.

12. The method of claim 11, further comprising:
    detecting, by the optical apparatus, at least one failure condition in the optical communication channel; and
    initiating, by the optical apparatus, a transmission of a second set of the first pulse signals at the first power level over the transmission link.

13. An optical arrangement to transmit and receive optical signals over an optical communication channel to a network, the optical arrangement including:
- a transmitter having a laser to transmit first optical signals over the optical communication channel;
- a receiver to receive second optical signals over the optical communication channel;
- a cage to receive an optical fiber cable that provides the optical communication channel; and
- circuitry to power on the laser, the circuitry including a breaker disposed inside the cage in a normally open state to provide a normally open circuit, wherein the laser is powered off, wherein insertion of a fiber optics connector of the optical fiber cable into the cage is to pivot the breaker to close the normally open circuit and to provide power to the laser,
- wherein the transmitter, prior to initiation of transmission of the first optical signals over the optical communication channel, transmit over a transmission link of the optical communication channel a first set of first pulse signals at a first power level to another optical apparatus; transmit a first set of second pulse signals at the first power level over the transmission link to the other optical apparatus; and transmit the first optical signals at a second power level over the transmission link to the other optical apparatus, wherein the second power level is greater than the first power level, wherein the second pulse signals are different than the first pulse signals in length or frequency, wherein the first and second pulse signals are independent of data to be provided in the first optical signals.

14. The optical arrangement of claim 13, further comprising a printed circuit board (PCB), wherein the cage is connected to the PCB.

15. The optical arrangement of claim 14, wherein the circuit grounds a laser power line of the circuitry to a common ground of the PCB.

16. The optical arrangement of claim 13, further comprising a network interface card (NIC) coupled with the optical arrangement to enable transmission and reception of the optical signals by the transmitter and receiver of the optical arrangement.

17. The optical arrangement of claim 13, further comprising:
- a controller coupled with the transmitter and the receiver to:
  - cause the transmitter to transmit over the transmission link of the optical communication channel the first set of first pulse signals at the first power level;
  - detect a change in optical power in a reception link of the optical communication channel, wherein the change indicates a presence of an optical signal from the other optical apparatus on the optical communication channel;
  - confirm that the other optical apparatus is capable of communications at the second power level; and
  - initiate the transmission of the first optical signals at the second power level over the transmission link by the transmitter to the other optical apparatus.

18. A computing system, comprising:
- a processor;
- a memory coupled with the processor; and
- a communication interface device coupled with the processor and memory, to connect the computing system with a network, wherein the communication interface device includes a network interface card having the optical arrangement of claim 13.

* * * * *